(12) United States Patent
Yamakose et al.

(10) Patent No.: US 7,927,027 B2
(45) Date of Patent: Apr. 19, 2011

(54) ARM PIVOT SHAFT SUPPORT MECHANISM AND IMAGING DEVICE EQUIPPED WITH THE SAME

(75) Inventors: Hiroshi Yamakose, Gifu (JP); Shinji Ono, Nagoya (JP)

(73) Assignee: Elmo Company, Limited (JP)

( * ) Notice: Subject to any disclaimer, the term of this patent is extended or adjusted under 35 U.S.C. 154(b) by 0 days.

(21) Appl. No.: 12/643,404

(22) Filed: Dec. 21, 2009

(65) Prior Publication Data
US 2010/0220991 A1     Sep. 2, 2010

(30) Foreign Application Priority Data
Feb. 27, 2009   (JP) .................... 2009-045249

(51) Int. Cl.
*G03B 17/00*    (2006.01)
*E05D 7/00*     (2006.01)
*E05D 11/00*    (2006.01)
(52) U.S. Cl. .............. 396/428; 16/221; 16/250
(58) Field of Classification Search .......... 396/419–428; 348/374, 373; 248/187.1; 352/197, 243; 174/374, 375, 542; 403/52, 65, 119, 164, 403/205; 16/221, 239, 250
See application file for complete search history.

(56) References Cited

U.S. PATENT DOCUMENTS 5,933,191 A  *  8/1999   Ariga et al. .................. 348/373
7,654,755 B2 *  2/2010   Orf et al. .................... 396/421

FOREIGN PATENT DOCUMENTS
JP         10-191105 A      7/1998
* cited by examiner

Primary Examiner — W. B. Perkey
Assistant Examiner — Minh Q Phan
(74) Attorney, Agent, or Firm — Ostrolenk Faber LLP

(57) ABSTRACT

A head arm pivot shaft support mechanism 180 has a cord covering unit 200 including a first part 210, a second part 220, and a third part 230. The first part 210 and the second part 220 are located on a side of one head-side engagement leg 186 of bifurcated head-side engagement legs 186 and 187 and are arranged to be rotatable about a pivot shaft member 193. The first part 210 and the second part 220 respectively have an arc-shaped peripheral wall 212 and an arc-shaped peripheral wall 222 protruded toward the third part 230 to fill a space on a bifurcation base side between the bifurcated head-side engagement legs 186 and 187. The third part 230 is located on a side of the other head-side engagement leg 187 and is arranged to be rotatable about the pivot shaft member 193. The third part 230 has a first arc-shaped peripheral wall 233 and a second arc-shaped peripheral wall 234 protruded toward the first part 210 and the second part 220 to fill spaces between edges of the arc-shaped peripheral wall 212 of the first part 210 and edges of the arc-shaped peripheral wall 222 of the second part 220. A cord extended from an internal camera incorporated in a camera head 150 runs through a cut 215 formed in the arc-shaped peripheral wall 212 and a cut 225 formed in the arc-shaped peripheral wall 222 and is covered with these arc-shaped peripheral walls 212 and 222 with avoiding interference with the pivot shaft member 193.

4 Claims, 12 Drawing Sheets

ARM PIVOT SHAFT SUPPORT MECHANISM AND IMAGING DEVICE EQUIPPED WITH THE SAME

CROSS-REFERENCE TO RELATED APPLICATIONS

The present application claims the priority based on Japanese Patent Application No. 2009-45249 filed on Feb. 27, 2009, the disclosure of which is hereby incorporated by reference in its entirety.

BACKGROUND

1. Technical Field

The present invention relates to an arm pivot shaft support mechanism configured to support an arm extended from an instrument unit with an internal electric instrument incorporated therein, as well as to an imaging device configured to support a camera head in a pivotally rotatable manner via an arm extended from the camera head.

2. Related Art

With the purpose of enhancing the convenience and improving the usability of an imaging device, a pivot shaft support mechanism for supporting a camera head in a pivotally rotatable manner by means of an arm structure has typically been adopted to change the imaging area of the imaging device (see JP-A-H10-191105). Such a mechanism has been applied for diversity of instrument units including electric instruments incorporated therein.

In the technique disclosed in the above cited reference, a cord for power supply and imaging signal output to an internal camera incorporated in the camera head is exposed at the position of the pivot shaft support mechanism.

From the viewpoints of the improved appearance and the cord protection, there is, however, a desire to cover the cord in the pivot shaft support mechanism. The camera head supported in the pivotally rotatable manner is rotated about a pivot shaft in both directions that are opposite to each other. Simply providing a cover on the pivot shaft support mechanism enables the cord to be concealed and protected by the cover during rotation of the camera head in only one direction but causes the cord to be exposed during rotation of the camera head in the reverse direction. This prior art method thus does not practically solve the problem. Such a cord covering problem arises not only in the imaging device but in other various devices equipped with the pivot shaft support mechanism.

SUMMARY

In order to solve one or more the problems of the prior art technique discussed above, there would be a requirement for assuring the effective cord covering in a pivot shaft support mechanism that allows for rotations of an instrument unit about a pivot shaft in both directions. The present invention accomplishes at least part of the requirement mentioned above and the other relevant requirements by an arm pivot shaft support mechanism and an imaging device having any of various configurations and arrangements discussed below.

According to one aspect, the invention is directed to an arm pivot shaft support mechanism configured to support an arm extended from an instrument unit with an internal electric instrument incorporated therein. The arm pivot shaft support mechanism has: bifurcated arm-side engagement legs provided on a terminal end of the arm; and a rotation support-side engagement leg provided on an opposed end, which is opposed to the terminal end of the arm, of a rotation support arm, on which the arm is supported in a pivotally rotatable manner. The arm pivot shaft support mechanism also has a pivot shaft inserted and fitted in through holes formed in the arm-side engagement legs and the rotation support-side engagement leg to support the arm via the arm-side engagement legs to be pivotally rotatable relative to the rotation support-side engagement leg. The arm pivot shaft support mechanism further has: a first engagement leg internal member and a second engagement leg internal member located on one of the bifurcated arm-side engagement legs and arranged to be respectively rotatable about the pivot shaft; and a third engagement leg internal member located on the other of the bifurcated arm-side engagement legs and arranged to be rotatable about the pivot shaft.

The first engagement leg internal member has: an arc-shaped base-side peripheral wall protruded toward the third engagement leg internal member to fill a space on a bifurcation base side between the bifurcated arm-side engagement legs; and a base-side cord pathway formed in the base-side peripheral wall to receive and allow for passage of a cord extended from the internal electric instrument. The second engagement leg internal member has: an arc-shaped end-side peripheral wall protruded toward the third engagement leg internal member to fill a space on a bifurcation end side between the bifurcated arm-side engagement legs; and an end-side cord pathway formed in the end-side peripheral wall to receive and allow for passage of the cord with avoiding interference with the pivot shaft. The third engagement leg internal member has: arc-shaped block peripheral walls protruded toward the first engagement leg internal member and the second engagement leg internal member to fill spaces between edges of the base-side peripheral wall and edges of the end-side peripheral wall.

The arm pivot shaft support mechanism according to this aspect of the invention is used to support the instrument unit with the internal electric instrument incorporated therein. The arm pivot shaft support mechanism supports the bifurcated arm-side engagement legs and the rotation support-side engagement leg to be pivotally rotatable about the pivot shaft. The bifurcated arm-side engagement legs are provided on the terminal end of the arm extended from the instrument unit. The rotation support-side engagement leg is provided on the opposed end, which is opposed to the terminal end of the arm, of the rotation support arm, on which the arm is supported in a pivotally rotatable manner. Namely the instrument unit with the internal electric instrument is attached to the arm and is supported to be pivotally rotatable in both directions about the pivot shaft, which is inserted and fitted in the through holes formed in the rotation support-side engagement leg and the arm-side engagement legs. The cord extended from the electric instrument is arranged to run from the bifurcated arm-side engagement legs and reach the rotation support-side engagement leg with avoiding interference with the pivot shaft. The first engagement leg internal member and the second engagement leg internal member are located On the side of one arm-side engagement leg of the bifurcated arm-side engagement legs. The third engagement leg internal member is located on the side of the other arm-side engagement leg. The first through the third engagement leg internal members are arranged to be respectively rotatable about the pivot shaft. When the instrument unit with the internal electric instrument is pivotally rotated with the arm, application of a force around the pivot shaft to the first through the third engagement leg internal members causes individual pivotal rotations of the respective engagement leg internal members.

In the arm pivot shaft support mechanism of the invention, the first engagement leg internal member has the arc-shaped base-side peripheral wall protruded toward the third engagement leg internal member to fill the space on the bifurcation base side between the bifurcated arm-side engagement legs. The first engagement leg internal member also has the base-side cord pathway formed in the base-side peripheral wall to receive and allow for passage of the cord extended from the internal electric instrument. The second engagement leg internal member has the arc-shaped end-side peripheral wall protruded toward the third engagement leg internal member to fill the space on the bifurcation end side between the bifurcated arm-side engagement legs. The second engagement leg internal member also has the end-side cord pathway formed in the end-side peripheral wall to receive and allow for passage of the cord with avoiding interference with the pivot shaft. When the instrument unit with the internal electric instrument is pivotally rotated with the arm in both directions, the cord extended from the electric instrument moves with changing its trajectory according to the pivotal rotation of the arm. The cord accordingly exerts a force around the pivot shaft to the base-side cord pathway of the first engagement leg internal member, so that the first engagement leg internal member pivotally rotates about the pivot shaft.

In the state of pivotal rotation of the first engagement leg internal member, the space on the bifurcation base side between the bifurcated arm-side engagement legs is kept covered with the arc-shaped base-side peripheral wall of the first engagement leg internal member. The second engagement leg internal member also receives a force exerted by the cord to pivotally rotate about the pivot shaft. In this state, the space on the bifurcation end side between the bifurcated arm-side engagement legs is kept covered with the arc-shaped end-side peripheral wall of the second engagement leg internal member. Additionally the third engagement leg internal member has the arc-shaped block peripheral walls protruded toward the first engagement leg internal member and the second engagement leg internal member to fill the spaces between the edges of the base-side peripheral wall of the first engagement leg internal member and the edges of the end-side peripheral wall of the second engagement leg internal member. The cord is accordingly kept covered with the arc-shaped peripheral walls over the whole path from the base-side cord pathway of the first engagement leg internal member to the end-side cord pathway of the second engagement leg internal member. The covered cord exerts a force to the third engagement leg internal member accompanied with the pivotal rotation of the instrument unit in both directions, so that the third engagement leg internal member pivotally rotates about the pivot shaft. The structure of the invention enables the cord to move with changing its trajectory without exposure to the outside. The arm pivot shaft support mechanism of this arrangement assures the effective cord covering during pivotal rotation of the instrument unit about the pivot shaft in both directions.

The arm pivot shaft support mechanism according to the above aspect of the invention may be designed to have various additional structures or arrangements. In one preferable application of the arm pivot shaft support mechanism according to the invention, the arc-shaped block peripheral walls of the third engagement leg internal member are located outside the base-side peripheral wall and the end-side peripheral wall. The third engagement leg internal member further has arc-shaped guide elements provided along rotation trajectories of the base-side peripheral wall of the first engagement leg internal member and the end-side peripheral wall of the second engagement leg internal member about the pivot shaft. This arrangement of the arm pivot shaft support mechanism effectively assures the stable rotations of the first engagement leg internal member and the second engagement leg internal member. In this application, the arc-shaped guide elements may be, for example, grooves or concaves of arc-shaped trajectories that receive therein ends of the base-side peripheral wall and the end-side peripheral wall.

According to another aspect, the invention is also directed to an imaging device configured to point an internal camera incorporated in a camera head toward a shooting object set in an imaging area and take an image of the shooting object. The imaging device has: a base; a base-side first arm structured to rise substantially upright from the base; and a base-side second arm extended from the base-side first arm to have an extending configuration extended over the imaging area. The imaging device also has a base-side arm pivot shaft support mechanism configured to support the base-side second arm on the base-side first arm in a pivotally rotatable manner and allow for rotation of the base-side second arm in a certain direction to change a geometrical configuration from the extending configuration extended over the imaging area to a folding configuration folded back on the base-side first arm and rotation of the base-side second arm in an opposite direction reverse to the certain direction. The imaging device further has: a head-side arm extended from the camera head to be transversely to an optical axis of the camera; and the arm pivot shaft support mechanism configured to support the head-side arm, which is extended to be substantially aligned with the base-side second arm, to be pivotally rotatable relative to the base-side second arm.

The arm pivot shaft support mechanism allows for rotation of the head-side arm relative to the base-side second arm in the extending configuration extended over the imaging area until the internal camera of the camera head points toward the base-side first arm. The arm pivot shaft support mechanism allows for rotation of the head-side arm relative to the base-side second arm in the folding configuration folded back on the base-side first arm until the internal camera of the camera head points the imaging area to shoot downward.

In the imaging device according to this aspect of the invention, the base-side second arm is supported in a pivotally rotatable manner on the base-side first arm, which is arranged to rise substantially upright from the base, by means of the arm pivot shaft support mechanism. The base-side second arm is pivotally rotated to change the geometrical configuration between the extending configuration extended over the imaging area and the folding configuration folded back on the base-side first arm. The head-side arm extended from the camera head to be transversely to the optical axis of the camera and to be substantially aligned with the base-side second arm is supported on the base-side second arm by means of the arm pivot shaft support mechanism. In the extending configuration of the base-side second arm extended over the imaging area, the head-side arm is substantially aligned with the base-side second arm and is extended over the imaging area. The internal camera of the camera head accordingly points the imaging area to shoot downward. The camera position in this state is at the height of the base-side first arm rising substantially upright from the base to be the furthermost position away from the imaging area. The imaging device with the camera set at this position is capable of shooting downward to take an image of a shooting object having relatively large dimensions.

The pivotal rotation of the head-side arm relative to the base-side second arm in the extending configuration extended over the imaging area is allowed until the internal camera of the camera head points toward the base-side first arm. The imaging device with the camera set at this position is capable of shooting oblique downward to take an image of a shooting object located on the imaging area. Namely the shooting angle is changed from downward to take a planner image to oblique downward to take an upward front image.

While the base-side second arm is pivotally rotated to change the geometrical configuration from the extending configuration extended over the imaging area to the folding configuration folded back on the base-side first arm, the head-side arm may be kept aligned with the base-side second arm and is folded back on the base-side first arm. In this state, the camera head is also folded back on the base-side firm arm. The head-side arm may be pivotally rotated relative to the base-side second arm by the allowable amount by the arm pivot rotation support mechanism to be lifted up from the configuration folded back on the base-side first arm and to be bent relative to the base-side second arm. The internal camera of the camera head then points the imaging area to shoot downward. In this state, the camera approaches to the imaging area by a distance corresponding to the amount of pivotal rotation of the base-side second arm to change the geometrical configuration from the extending configuration extended over the imaging area to the folding configuration folded back on the base-side first arm. The imaging device of the invention is capable of adjusting the position of the camera in the vertical direction according to the dimensions of a shooting object and shooting downward to take an enlarged image of the shooting object.

In a non-use condition of the imaging device, for example, during transportation or during storage, the camera head as well as the head-side arm extended to be substantially aligned with the base-side second arm is folded back on the base-side first arm. This arrangement desirably saves the space required for the imaging device in the non-use condition. In this case, the base may be located at a position having no interference with the imaging area. The base does not have a stage for mounting a shooting object thereon and is thereby formed in relatively small dimensions. This arrangement desirably saves the space required for the imaging device in the folding configuration in the non-use condition.

DESCRIPTION OF THE PREFERRED EMBODIMENTS

Figure 1:
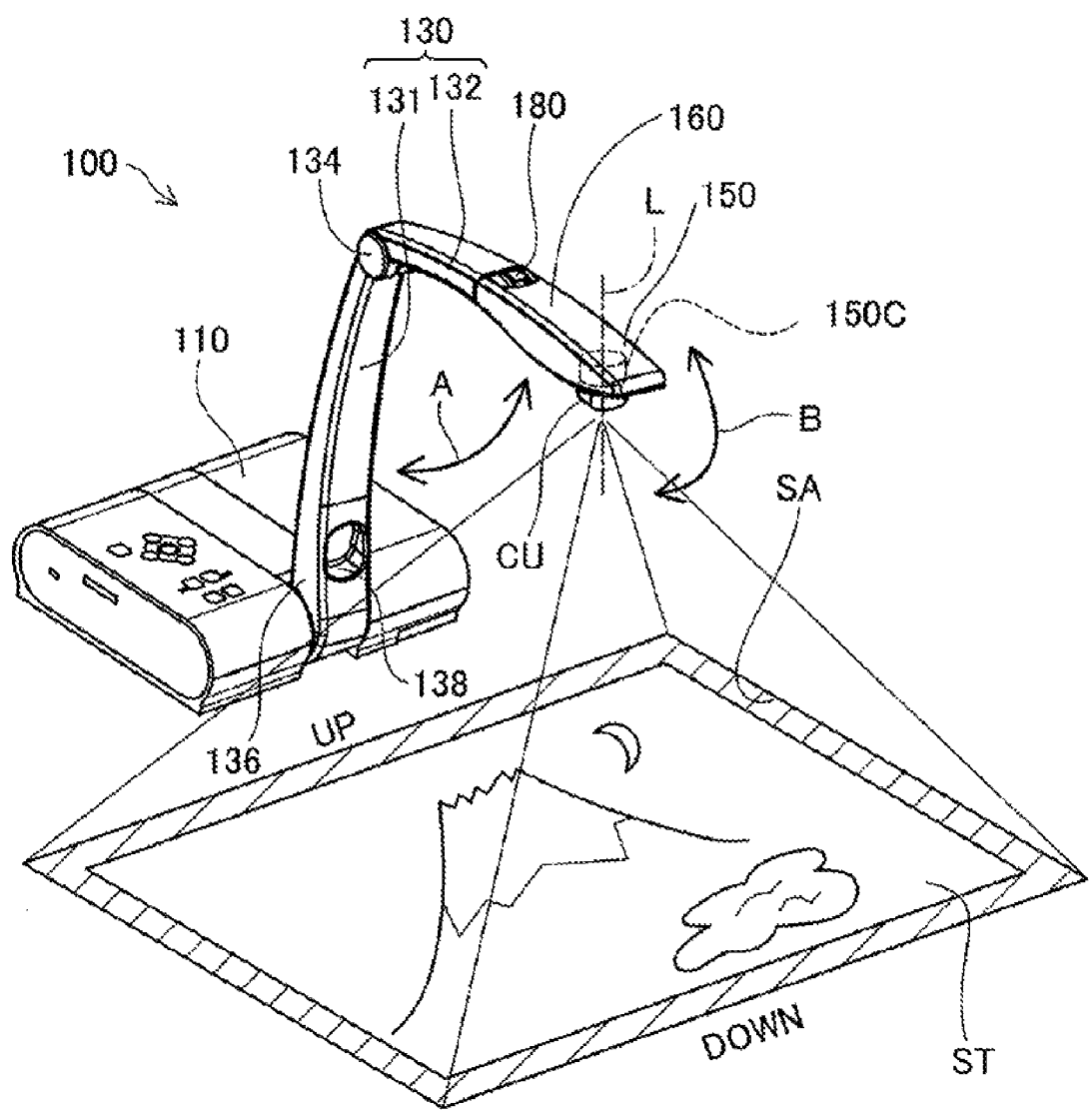
FIG. 1 is a front-side perspective view illustrating an imaging device 100 set in a first imaging mode in accordance with one embodiment of the invention.
Figure 2:
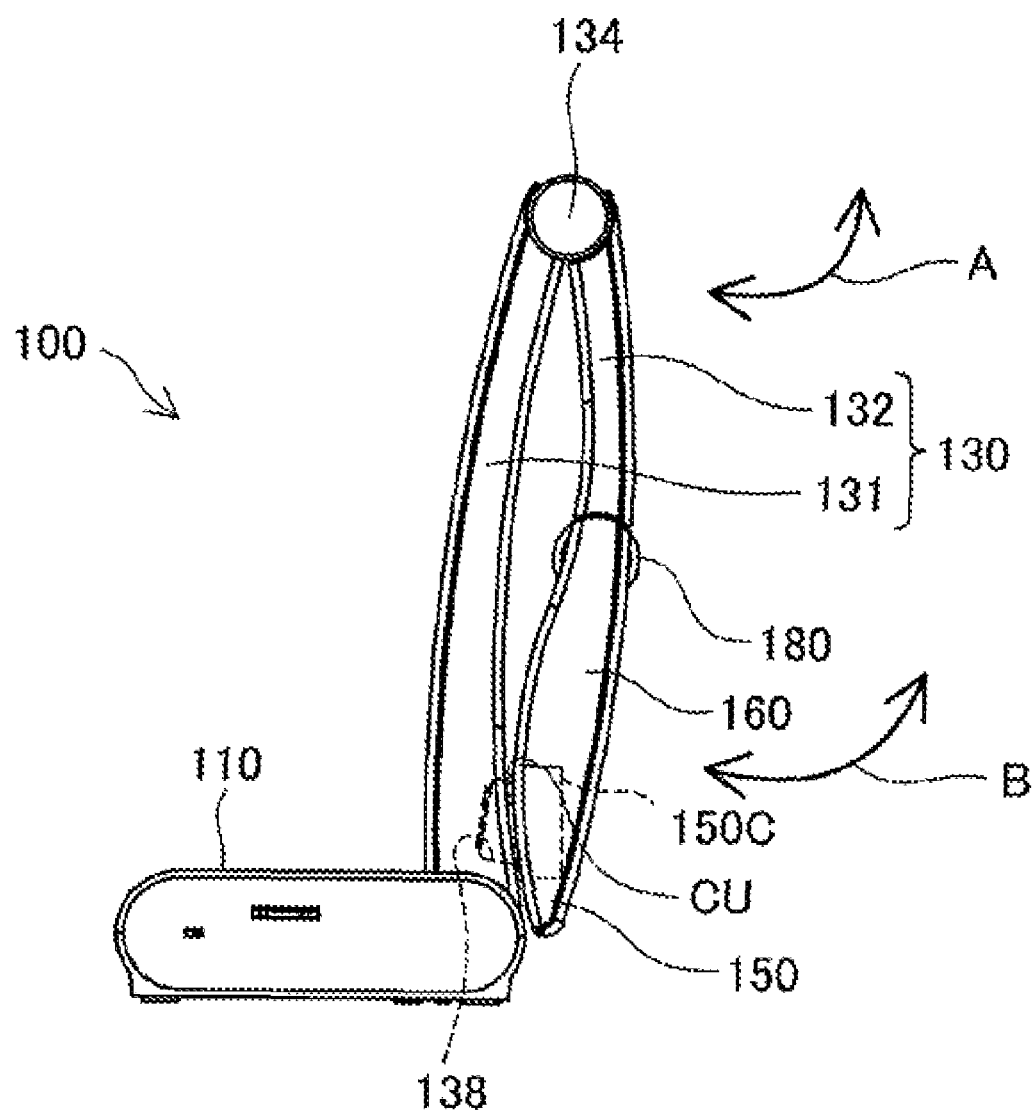
FIG. 2 is a side view illustrating the imaging device 100 set in a non-use condition.

One mode of carrying out the invention is described below as a preferred embodiment with reference to the accompanied drawings. FIG. 1 is a front-side perspective view illustrating an imaging device 100 set in a first imaging mode in accordance with one embodiment of the invention. FIG. 2 is a side view illustrating the imaging device 100 set in a non-use condition.

As illustrated, the imaging device 100 includes a base 110, a camera support arm 130, and a camera head 150. The base 110 is constructed as a casing of a preset weight to keep the imaging device 100 stable both in imaging modes with the camera head 150 extended and in a non-use condition with the camera head 150 folded as discussed below. The base 110 has a set of switches including a power switch of the imaging device 100 and a mounting mechanism for a memory card outside of the casing, while having control circuitry and various equipment of the imaging device 100 inside of the casing. These constituents are not directly related to the subject matter of the invention and are thus not specifically described here.

The camera support arm 130 includes a first arm 131 provided on the side of the base 110 and a second arm 132 provided on the side of the camera head 150. The first arm 131 is structured to rise substantially upright from the base 110 and is fastened to the base 110. The camera support arm 130 has a bottomed depressed recess 138, which is formed on an arm front side of an arm base 136 structured as a leg of the first arm 131 fastened to the base 110. The depressed recess 138 will be discussed later in detail.

The second arm 132 is held on an upper end of the first arm 131 by means of an arm pivot shaft support mechanism 134 to be pivotally rotatable in a preset vertical plane in a direction of an arrow A. The arm pivot shaft support mechanism 134 has a known shaft support structure that uses a pivot shaft and a shaft support member with a shaft hole for receiving the pivot shaft fitted therein and rotates the pivot shaft relative to the shaft support member. The arm pivot shaft support mechanism 134 has a clicking structure (not shown) to set the geometrical configuration of the second arm 132 between a horizontally extending configuration and a folding configuration. The second arm 132 is set in the horizontally extending configuration to be extended over an imaging area SA in front of the base 110, for example, in the first imaging mode shown in FIG. 1. The second arm 132 is set in the folding configuration to be folded back on the first arm 131, for example, in the non-use condition shown in FIG. 2. The user pivotally rotates the second arm 132 to a desired geometrical configuration selected between the horizontally extending configuration and the folding configuration. When sensing a click, the user stops a further pivotal rotation but holds the second arm 132 in the selected geometrical configuration. Namely the pivotal rotation of the second arm 132 by means of the arm pivot shaft support mechanism 134 changes the geometrical configuration of the second arm 132 between the horizontally extending configuration, for example, in the first imaging mode shown in FIG. 1, and the folding configuration to be folded back on the first arm 131, for example, in the non-use condition shown in FIG. 2. The second arm 132 is thus rotatable in a direction to change the geometrical configuration from the horizontally extending configuration to be extended over the imaging area SA to the folding configuration to be folded back on the first arm 131 and in an opposite direction.

The camera head 150 includes a lens unit CU that has an edge section protruded from a lower face of the camera head 150 and an internal camera 150C for taking images, and has a head-side arm 160 that is extended to be transverse to an optical axis L of the camera. As shown in FIG. 1, the camera head 150 is held in a pivotally rotatable manner on one end of the second arm 132 via the head-side arm 160 by means of a head arm pivot shaft support mechanism 180. The head-side arm 160 is extended from the second arm 132 to be substantially aligned with the second arm 132. In the first imaging mode of FIG. 1, the head-side arm 160 extended to be aligned with the second arm 132 is located over the imaging area SA, while the second arm 132 is extended from the upper end of the first arm 131 over the imaging area SA. In this first imaging mode, the camera head 150 points the optical axis L of the camera 150C included in the lens unit CU toward the imaging area SA and positions the camera 150C just opposite to a shooting object sheet ST set in the imaging area SA to shoot downward and take an image of the shooting object sheet ST. The camera position in the first imaging mode is at a height of the first arm 131 rising substantially upright from the base 110 to be the furthermost position away from the imaging area SA. The imaging device 100 set in the first imaging mode is thus capable of shooting downward and taking an image of a large-size subject, for example, the shooting object sheet ST having relatively large dimensions as shown in FIG. 1.

In the first imaging mode of FIG. 1, the imaging view field of the camera 150C corresponds to the visual field of the user facing the base 110 across the imaging area SA. The camera is constructed as an automatic focusing camera having a zooming function. Components required for such auto focusing and zooming functions, for example, an automatic focus button and a zoom dial (not shown), are provided on a suitable location of the camera head 150, for example, on a side face of the camera head 150 or on a top face of the base 110.

In the folding configuration in the non-use condition of FIG. 2, the second arm 132 engaged with the camera head 150 by the head arm pivot shaft support mechanism 180 is pivotally rotated about the arm pivot shaft support mechanism 134 to be folded back on the arm front side of the first arm 131. The depressed recess 138 provided on the arm front side of the first arm 131 is formed to have a greater diameter than the diameter of the protruded edge section of the lens unit CU. The position of the depressed recess 138 is determined to be located on a trajectory of the pivotally rotating edge section of the lens unit CU about the arm pivot shaft support mechanism 134. As shown in FIG. 2, in the folding configuration where the second arm 132 engaged with the camera head 150 is pivotally rotated to be folded back on the arm front side of the first arm 131, the protruded edge section of the lens unit CU is received in the depressed recess 138 and is surrounded by the peripheral inner wall of the depressed recess 138. In the non-use condition, the imaging device 100 of the embodiment readily but effectively protects the camera 150C or more specifically a camera lens in the edge section of the lens unit CU from potential damages by the simple pivotal rotation of the second arm 132 to the folding configuration shown in FIG. 2. This arrangement assures the easy handling of the imaging device 100. In the folding configuration of FIG. 2, the second arm 132 engaged with the camera head 150 is folded back on the arm front side of the first arm 131. This geometrical configuration desirably saves the space of the imaging device 100 in the non-use condition. The simple pivotal rotation of the second arm 132 with the camera head 150 changes the geometrical configuration from the folding configuration in the non-use condition of FIG. 2 to the horizontally extending configuration in the first imaging mode of FIG. 1 to promptly take the image of the relatively large-size shooting object sheet ST with the internal camera of the camera head 150.

Figure 3:
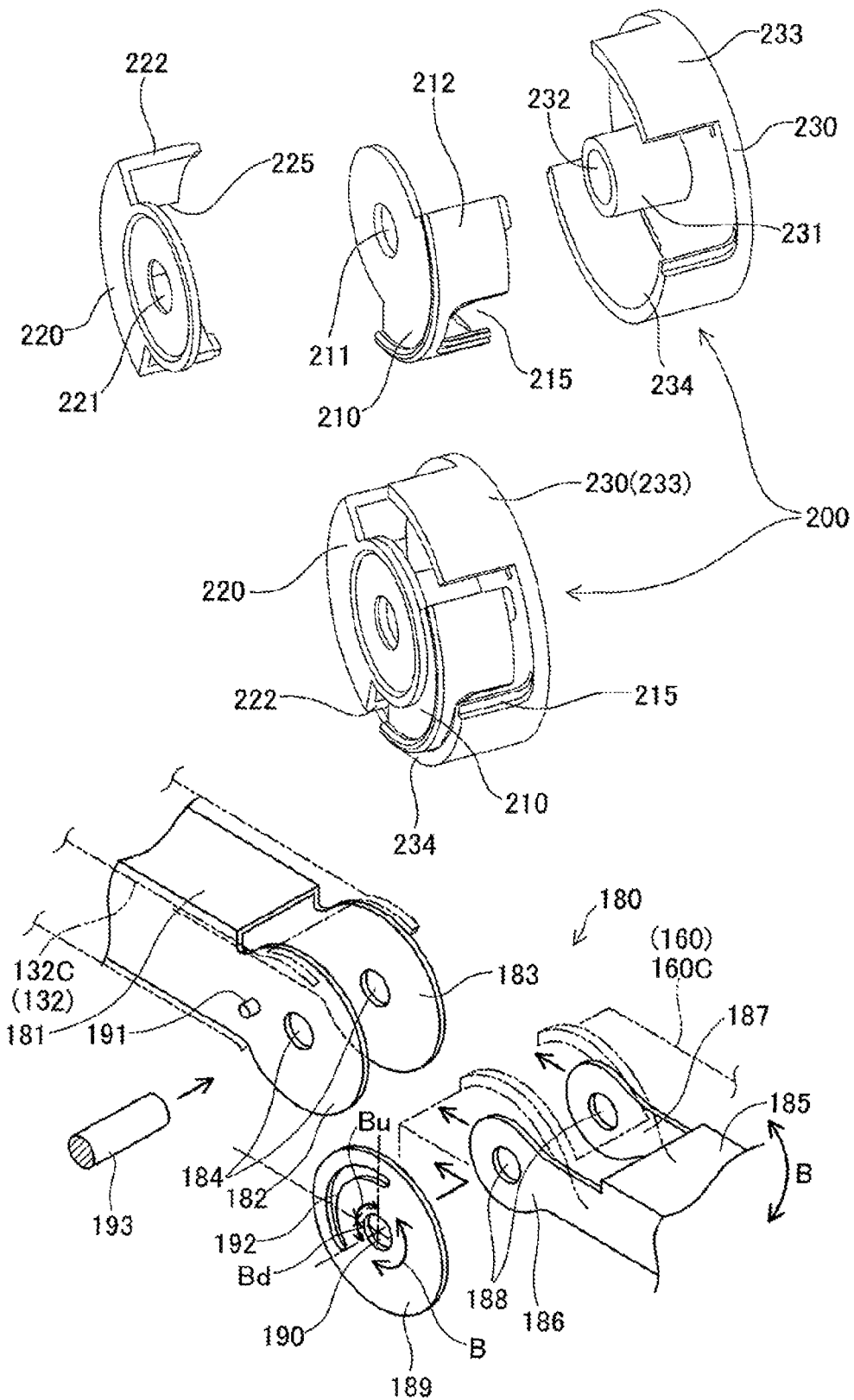
FIG. 3 is an exploded view showing the schematic structure of a head arm pivot shaft support mechanism 180 included in the imaging device 100.

The structure of supporting the camera head 150 by the head arm pivot shaft support mechanism 180 is explained below. FIG. 3 is an exploded view showing the schematic structure of the head arm pivot shaft support mechanism 180. The head arm pivot shaft support mechanism 180 is constructed, such that a head-side frame 185 surrounded by a cover 160C of the head-side arm 160 is supported in a pivotally rotatable manner on an arm-side frame 181 surrounded by a cover 132C of the second arm 132. The arm-side frame 181 is bifurcated on one end thereof to have a pair of arm support-side engagement legs 182 and 183, which are opposed to each other and have through holes 184 formed on the respective centers. The head-side frame 185 is bifurcated on one end thereof to have a pair of head-side engagement legs 186 and 187, which are opposed to each other and have through holes 188 formed on the respective centers. The head-side engagement legs 186 and 187 of the head-side frame 185 are designed to have an interval that allows the arm support-side engagement legs 182 and 183 of the arm-side frame 181 to be fitted precisely therein. The peripheral areas of the through holes 188 in the head-side engagement legs 186 and 187 of the head-side frame 185 are brought into contact with the peripheral areas of the through holes 184 in the arm support-side engagement legs 182 and 183 of the arm-side frame 181. Alternatively the head-side engagement legs 186 and 187 may be designed to have an interval identical with an interval between the arm support-side engagement legs 182 and 183. In this modified structure, the arm support-side engagement leg 182 is fitted inside the head-side engagement leg 186, while the arm support-side engagement leg 183 is fitted outside the head-side engagement leg 187.

The head-side frame 185 has a disk-shaped rotation restriction member 189 fastened to the head-side engagement leg 186. The rotation restriction member 189 has a through hole 190, which is to be aligned with the through hole 188 formed in the head-side engagement leg 186. The rotation restriction member 189 also has an arc-shaped through slot 192 formed along the outer circumference thereof. In the head arm pivot shaft support mechanism 180, the arm support-side engagement legs 182 and 183 of the arm-side frame 181 are fitted between the head-side engagement legs 186 and 187 of the head-side frame 185. A pivot shaft member 193 is then inserted from the side of the rotation restriction member 189 into the respective through holes 190, 188, and 184. The head-side frame 185 is accordingly held on the arm-side frame 181 to be pivotally rotatable about the pivot shaft member 193. The rotatable support of the head-side frame 185 on the arm-side frame 181 by the head arm pivot shaft support mechanism 180 enables the head-side arm 160 of the camera head 150 to be pivotally rotated relative to the second arm 132 in both directions from the configuration substantially aligned with the second arm 132. The pivot shaft member 193 is held by a pair of shaft holding members (not shown), which are located outside the head-side engagement legs 186 and 187 of the head-side frame 185 to prevent the pivot shaft member 193 from being slipped off in the axial direction from the through holes 190, 188, and 184.

A restriction projection 191 formed on the arm support-side engagement leg 183 of the arm-side frame 181 is set in the arc-shaped through slot 192 of the rotation restriction member 189 to achieve the rotatable support of the head-side frame 185 on the arm-side frame 181. The head arm pivot shaft support mechanism 180 supports the head arm 160 to be pivotally rotated relative to the second arm 132 in both directions from the configuration substantially aligned with the second arm 132 as shown by an arrow B in FIGS. 1 and 3, while restricting the pivotal rotation of the head-side arm 160 relative to the second arm 132 into the arc of the arc-shaped through slot 192. In the state where the restriction projection 191 is located on a horizontal axis in the arc-shaped through slot 192 shown in FIG. 3, the head-side arm 160 is set in the configuration substantially aligned with the second arm 132. The head-side arm 160 is pivotally rotated in both directions from this horizontal configuration as shown by the arrow B. The respective ends of the arc-shaped through slot 192 define the ends of the pivotal rotation in these two directions. In the state where the restriction projection 191 is located on one end of the arc-shaped through slot 192 on the side of an arrow Bd from the horizontal configuration, the head arm 160 is set in a second imaging mode (discussed later with reference to FIG. 16) to be extended oblique downward over the imaging area SA. In the state where the restriction projection 191 is located on the other end of the arc-shaped through slot 192 on the side of an arrow Bu from the horizontal configuration, the head arm 160 is set in a third imaging mode (discussed later with reference to FIG. 17) to be extended over the imaging area SA.

The head-side arm 160 is pivotally rotated in the state where the peripheral areas of the through holes 188 in the head-side engagement legs 186 and 187 of the head-side frame 185 are brought into contact with the peripheral areas of the through holes 184 in the arm support-side engagement legs 182 and 183 of the arm-side frame 181. The contact resistance of the head-side frame 185 with the arm-side frame 181 causes the head-side arm 160 to be held relative to the second arm 132 at any position specified by the pivotal rotation in the restricted rotation range.

The cord covering structure in the head arm pivot shaft support mechanism 180 is described below. The camera head 150 has a cord located inside the head-side frame 185 to be used for power supply and signal output to the internal camera. The cord is extended from the bifurcated head-side engagement legs 186 and 187 to the arm-side frame 181 of the second arm 132 and is covered by a cord covering unit 200 to be arranged with avoiding interference with the pivot shaft member 193 in the head arm pivot shaft support mechanism 180. As shown in FIG. 3, the cord covering unit 200 includes a first part 210 and a second part 220 located on one head-side engagement leg 186 of the bifurcated head-side engagement legs 186 and 187, and a third part 230 located on the other head-side engagement leg 187 of the bifurcated head-side engagement legs 186 and 187. The first through the third parts 210, 220, and 230 are designed to be rotatable about the pivot shaft member 193. In the structure of this embodiment, the bifurcated arm support-side engagement legs 182 and 183 are fitted between the bifurcated head-side engagement legs 186 and 187. The cord covering unit 200 is thus inserted to be precisely fitted between the arm support-side engagement legs 182 and 183. The first through the third parts 210, 220, and 230 are arranged to have the positional relations to the bifurcated head-side engagement legs 186 and 187 as explained above.

Figure 4:
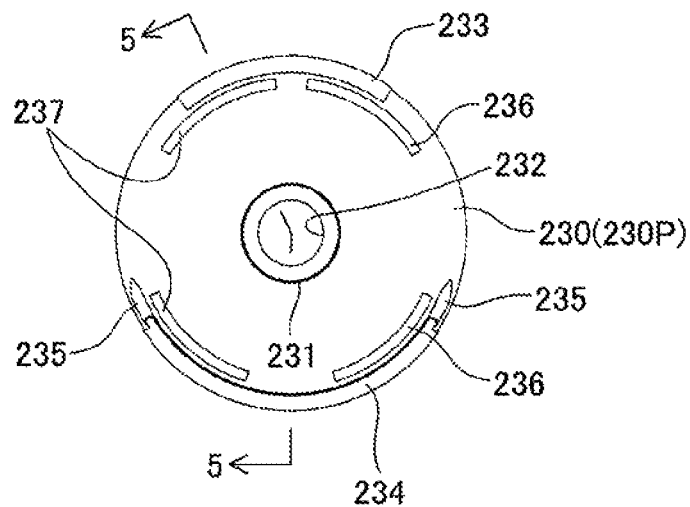
FIG. 4 is a front view of a third part 230 included in the head arm pivot shaft support mechanism 180, seen from the left side of FIG. 3.
Figure 5:
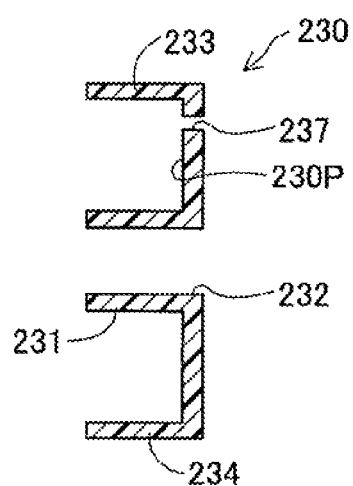
FIG. 5 is a sectional end view showing the third part 230, taken on a line 5-5 in FIG. 4.
Figure 6:
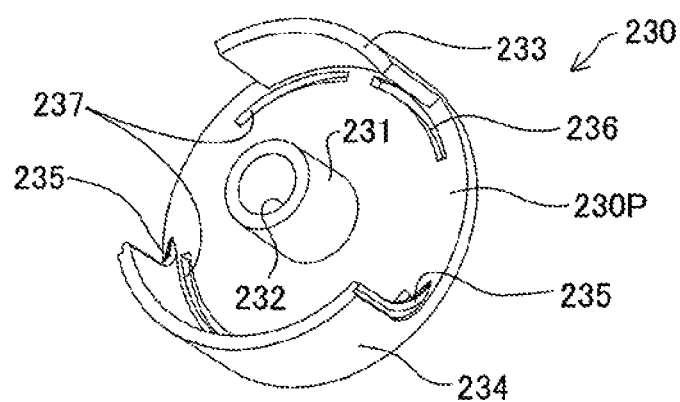
FIG. 6 is an upward front-side perspective view of the third part 230.
Figure 7:
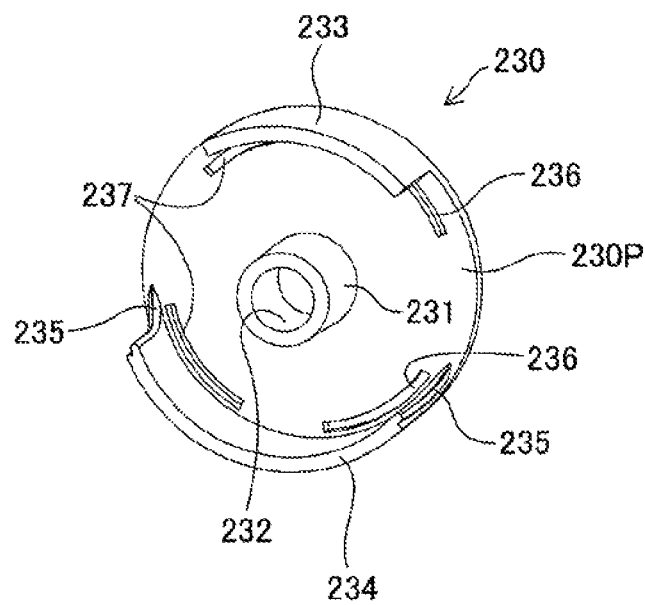
FIG. 7 is a downward front-side perspective view of the third part 230.
Figure 8:
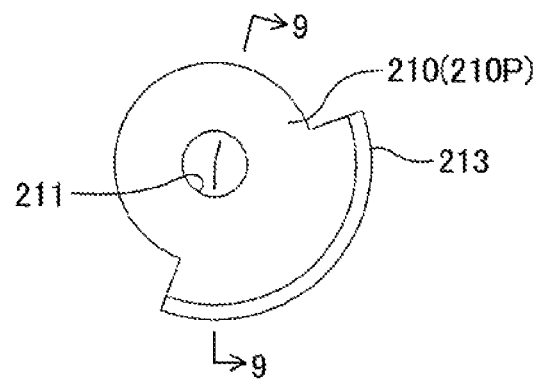
FIG. 8 is a front view of a first part 210 included in the head arm pivot shaft support mechanism 180, seen from the left side of FIG. 3.
Figure 9:
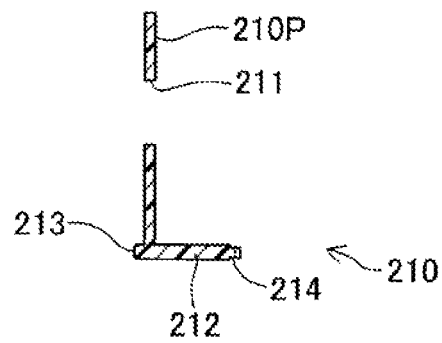
FIG. 9 is a sectional end view showing the first part 210, taken on a line 9-9 in FIG. 8.
Figure 10:
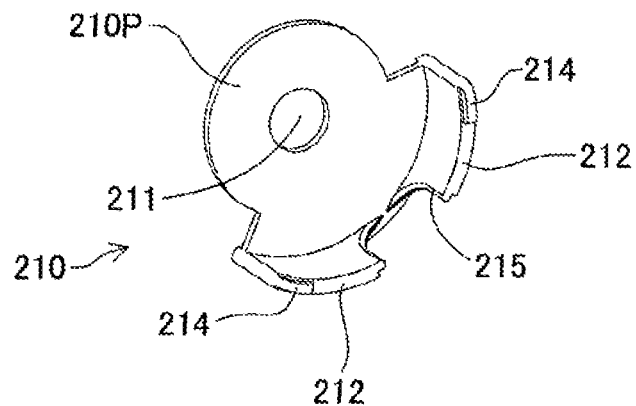
FIG. 10 is a perspective view of the first part 210, seen from the right side of FIG. 9.
Figure 11:
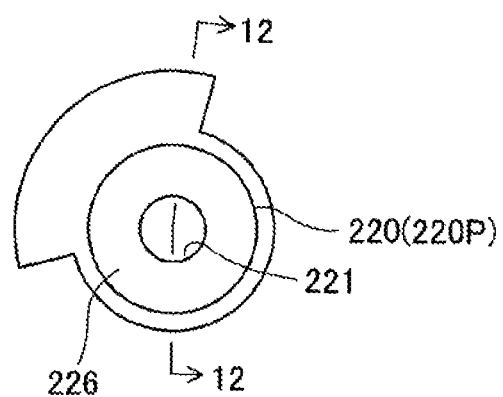
FIG. 11 is a front view of a second part 220 included in the head arm pivot shaft support mechanism 180, seen from the left side of FIG. 3.
Figure 12:
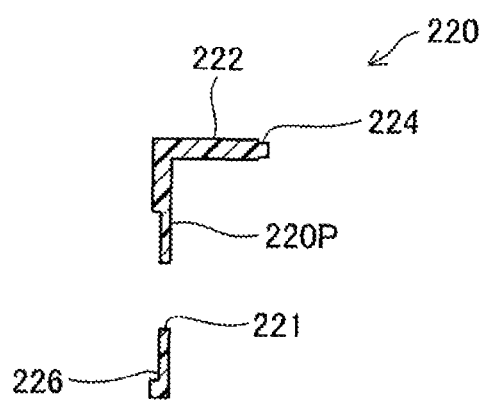
FIG. 12 is a sectional end view showing the second part 220, taken on a line 12-12 in FIG. 11.
Figure 13:
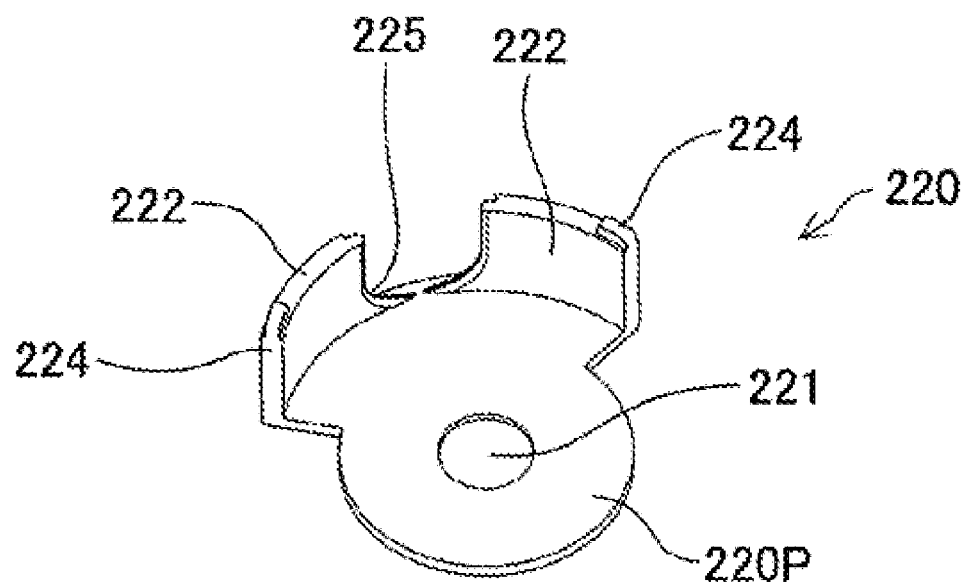
FIG. 13 is a perspective view of the second part 220, seen from the right side of FIG. 12.

The detailed structure of the cord covering unit 200 is described below. FIG. 4 is a front view of the third part 230, seen from the left side of FIG. 3. FIG. 5 is a sectional end view showing the third part 230, taken on a line 5-5 in FIG. 4. FIG. 6 is an upward front-side perspective view of the third part 230. FIG. 7 is a downward front-side perspective view of the third part 230. FIG. 8 is a front view of the first part 210, seen from the left side of FIG. 3. FIG. 9 is a sectional end view showing the first part 210, taken on a line 9-9 in FIG. 8. FIG. 10 is a perspective view of the first part 210, seen from the right side of FIG. 9. FIG. 11 is a front view of the second part 220, seen from the left side of FIG. 3. FIG. 12 is a sectional end view showing the second part 220, taken on a line 12-12 in FIG. 11. FIG. 13 is a perspective view of the second part 220, seen from the right side of FIG. 12.

As shown in FIGS. 4 through 7, the third part 230 has a disk-shaped plate 230P with a through hole 232 formed in a sleeve 231 on a plate center. The through hole 232 is formed to have an inner diameter slightly greater than the shaft diameter of the pivot shaft member 193. After assembly of the cord covering unit 200, the third part 230 is thus rotatable about the pivot shaft member 193. The third part 230 has a first arc-shaped peripheral wall 233 and a second arc-shaped peripheral wall 234 provided along the circumference of the plate 230P to surround the sleeve 231. Both ends of the second arc-shaped peripheral wall 234 form curved edges 235. The first arc-shaped peripheral wall 233 and the second arc-shaped peripheral wall 234 are protruded toward the first part 210 and 220 to be located between peripheral walls (explained later) of the first part 210 and the second part 220 in the assembled cord covering unit 200 as shown in FIG. 3. This arrangement will be discussed later in detail. The third part 230 also has first arc-shaped through slots 236 and second arc-shaped through slots 237 formed in the plate 230P to be arranged along the bases of the arc-shaped peripheral walls 233 and 234. The trajectories of these arc-shaped through slots 236 and 237 will be described later.

As shown in FIGS. 8 through 10, the first part 210 has a disk-shaped plate 210P with a through hole 211 formed on a plate center. The through hole 211 is formed to have an inner diameter slightly greater than the shaft diameter of the pivot shaft member 193. After assembly of the cord covering unit 200, the first part 210 is thus rotatable about the pivot shaft member 193. The first part 210 has an arc-shaped peripheral wall 212 protruded from part of the circumference of the plate 210P. The arc-shaped peripheral wall 212 has a base end slightly protruded in an opposite direction from the plate 210P to form an arc-shaped projection 213. Both edges on a free end of the arc-shaped peripheral wall 212 form convex pieces 214 extended from the arc-shaped peripheral wall 212 to have a smaller wall thickness than the wall thickness of the arc-shaped peripheral wall 212. The first part 210 has a cut 215 formed in a roughly center area of the arc-shaped peripheral wall 212. The cut 215 is formed to have a curved shape toward the plate 210P. The width of the cut 215 is determined according to the shape of the cord extended from the internal camera of the camera head 150. The arc-shaped peripheral wall 212 is protruded toward the third part 230 in the assembled cord covering unit 200 as shown in FIG. 3.

As shown in FIGS. 11 through 13, the second part 220 has a disk-shaped plate 220P with a through hole 221 formed on a plate center. The through hole 221 is formed to have an inner diameter slightly greater than the shaft diameter of the pivot shaft member 193. After assembly of the cord covering unit 200, the second part 220 is thus rotatable about the pivot shaft member 193. The second part 220 has an arc-shaped peripheral wall 222 protruded from part of the circumference of the plate 220P. Both edges on a free end of the arc-shaped peripheral wall 222 form a convex pieces 224 extended from the arc-shaped peripheral wall 222 to have a smaller wall thickness than the wall thickness of the arc-shaped peripheral wall 222. The second part 220 has a cut 225 formed in a roughly center area of the arc-shaped peripheral wall 222. The cut 225 is formed to have a curved shape toward the plate 220P. The width of the cut 225 is determined according to the shape of the cord extended from the internal camera of the camera head 150. The arc-shaped peripheral wall 222 is protruded toward the third part 230 in the assembled cord covering unit 200 as shown in FIG. 3. The periphery of the through hole 221 is formed as a step 226, in order to decrease the contact area with the arm support-side engagement leg 182.

The cord covering unit 200 having the structure discussed above is combined with the head arm pivot shaft support mechanism 180 according to the following procedure. The procedure first inserts the bifurcated arm support-side engagement legs 182 and 183 in the second arm 132 to be fitted between the bifurcated head-side engagement legs 186 and 187 in the head-side arm 160 of the camera head 150. The cord extended from the internal camera runs from the head-side engagement legs 186 and 187 to the arm support-side engagement legs 182 and 183 and is covered by the cord covering unit 200. The procedure then places the cord covering unit 200 between the arm support-side engagement legs 182 and 183 and inserts the pivot shaft member 193 to be fitted into the through holes of the respective members and parts. The cord is covered by the cord covering unit 200 according to the following procedure.

The procedure makes the third part 230 approach to the side of the cord running from the head-side engagement legs 186 and 187 toward the arm support-side engagement legs 182 and 183 and places the cord on the sleeve 231 shown in FIG. 3. Namely the cord is located between the first arc-shaped peripheral wall 233 and the second arc-shaped peripheral wall 234 with avoiding interference with the through hole 232 formed in the sleeve 231 or with the pivot shaft member 193. The procedure lays the first part 210 and the second part 220 on the third part 230 in this sequence and positions the cord covering unit 200 to be fitted between the arm support-side engagement legs 182 and 183. In the first part 210, the cord is set in the cut 215 formed in the arc-shaped peripheral wall 212, and the arc-shaped peripheral wall 212 fills the space on the base side of the bifurcated head-side engagement legs 186 and 187. In the second part 220, the cord is set in the cut 225 formed in the arc-shaped peripheral wall 222, and the arc-shaped peripheral wall 222 fills the space on the base side of the bifurcated arm support-side engagement legs 182 and 183 of the second arm 132, that is, the space on the end side of the bifurcated head-side engagement legs 186 and 187. In this configuration, the through holes 221, 211, and 232 of the second, the first, and the third parts 220, 210, and 230 in the cord covering unit 200 are aligned with the through holes 184 and 188 of the respective engagement legs 182, 183, 186, and 187. The pivot shaft member 193 is then inserted into the aligned through holes 221, 211, 232, 184, and 188.

The first part 210 and the second part 220 are coupled with the third part 230 by inserting the convex pieces 214 formed on both edges on the free end of the arc-shaped peripheral wall 212 of the first part 210 into the first arc-shaped through slots 236 of the third part 230 and inserting the convex pieces 224 formed on both edges on the free end of the arc-shaped peripheral wall 222 of the second part 220 into the second arc-shaped through slots 237 of the third part 230. The first arc-shaped through slots 236 and the second arc-shaped through slots 237 are formed according to the rotation trajectories of the respective arc-shaped peripheral walls 212 and 222 of the first and the second parts 210 and 220. The first part 210 and the second part 220 are guided on the respective free ends of the arc-shaped peripheral walls 212 and 222 to be rotatable about the pivot shaft member 193.

Figure 14:
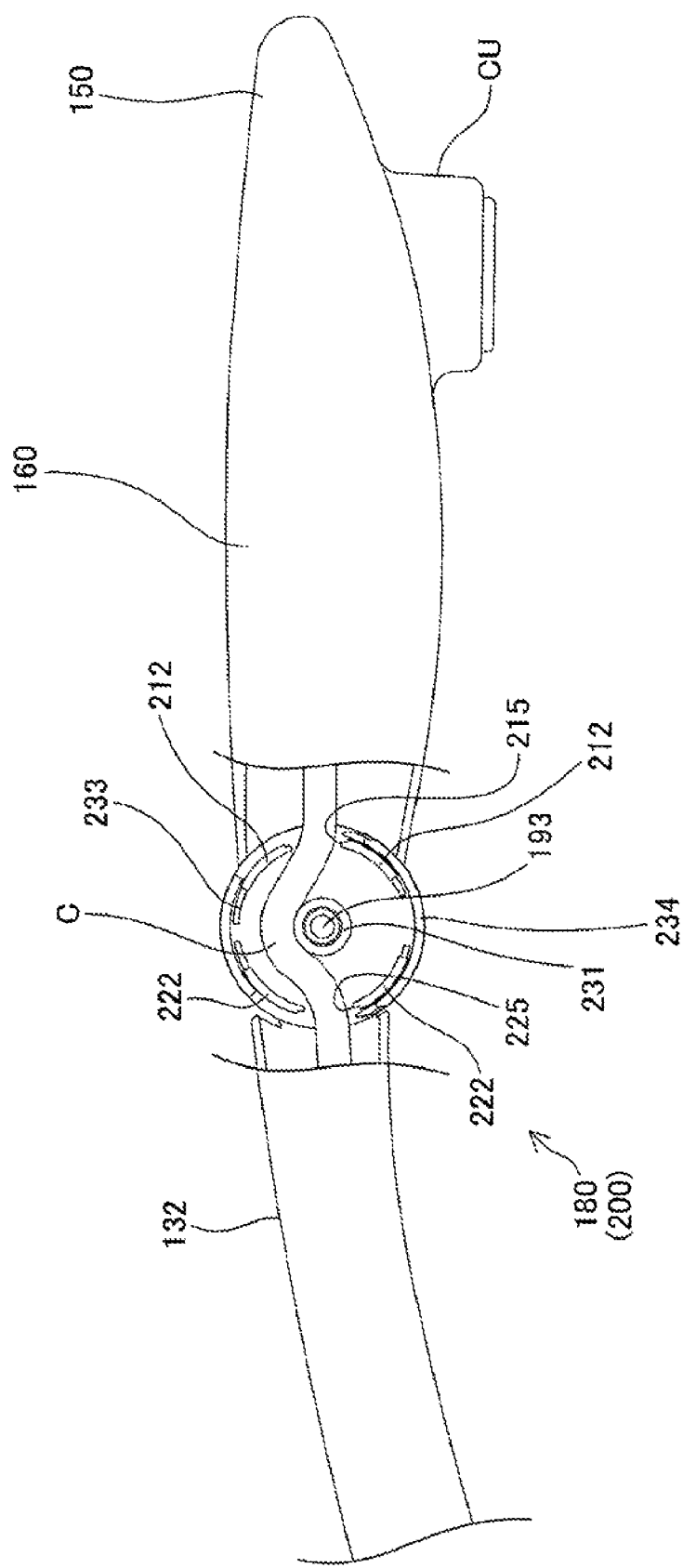
FIG. 14 is an explanatory view showing a cord covering state of a cord covering unit 200 in the imaging device 100 set in the first imaging mode where a head-side arm 160 is extended to be substantially aligned with a second arm 132.

The assembly of the cord covering unit 200 and the shaft support by the pivot shaft member 193 enable the camera head 150 to be rotatable in both directions relative to the second arm 132 via the head-side arm 160 by the head arm pivot shaft support mechanism 180. In the head arm pivot shaft support mechanism 180, the cord extended from the internal camera of the camera head 150 is covered with the arc-shaped peripheral wall 212 of the first part 210 on the base side of the bifurcated head-side engagement legs 186 and 187, while being covered with the arc-shaped peripheral wall 222 of the second part 220 on the end side of the bifurcated head-side engagement legs 186 and 187. The spaces between the arc-shaped peripheral walls 212 and 222 of the first and the second parts 210 and 220 are filled with the first arc-shaped peripheral wall 233 and the second arc-shaped peripheral wall 234 of the third part 230. FIG. 14 is an explanatory view showing a cord covering state of the cord covering unit 200 in the imaging device 100 set in the first imaging mode where the head-side arm 160 is extended to be substantially aligned with the second arm 132. A cord C is covered over the whole pathway in the head arm pivot shaft support mechanism 180 as shown in FIG. 14.

Figure 15:
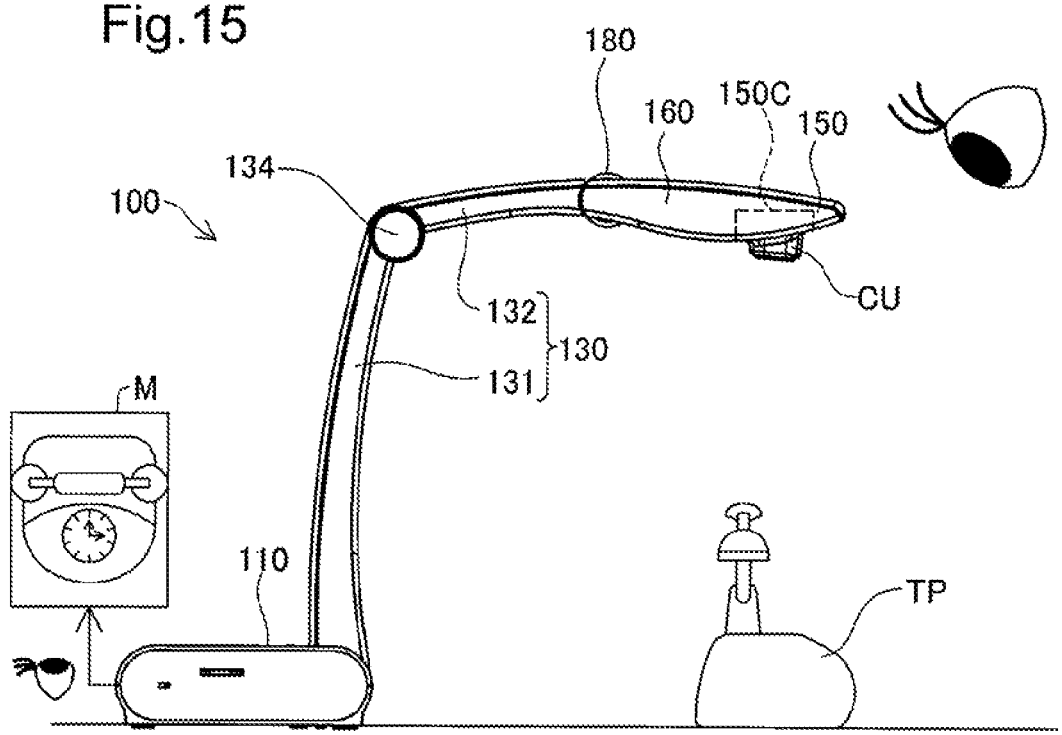
FIG. 15 is an explanatory view schematically showing the imaging device 100 set in the first imaging mode of FIG. 1 to take an image of a three-dimensional subject TP and a resulting image output.
Figure 16:
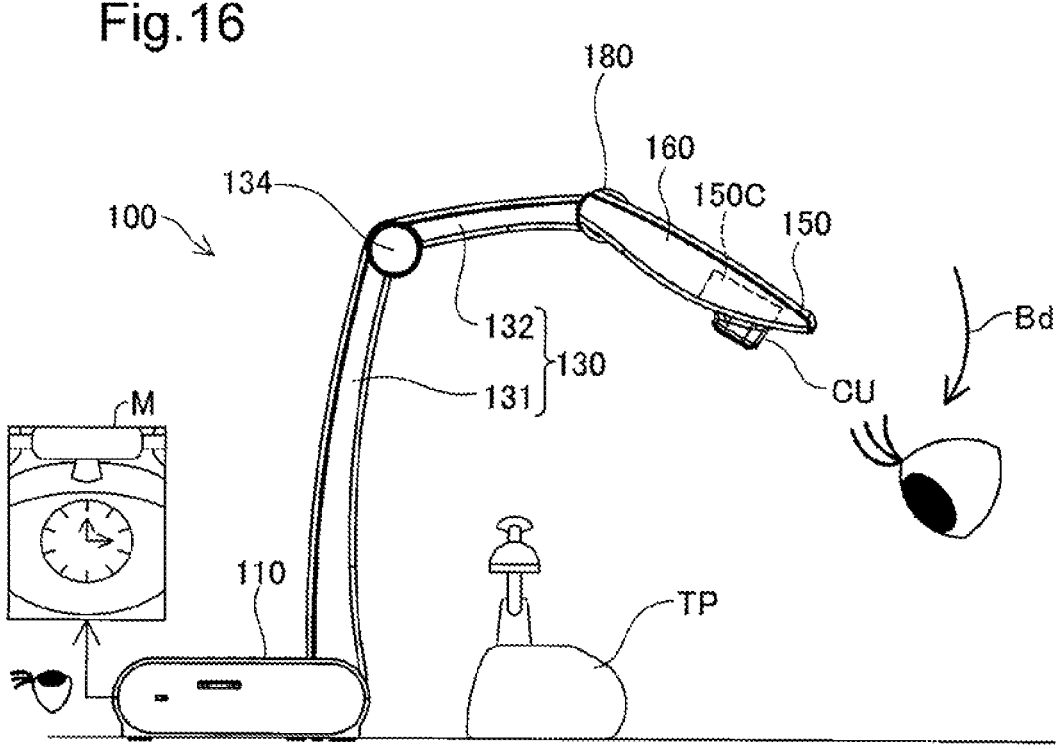
FIG. 16 is an explanatory view schematically showing the imaging device 100 set in a second imaging mode, where a camera head 150 is pivotally rotated oblique downward, to shoot oblique downward and take an image of the three-dimensional subject TP and a resulting image output.
Figure 17:
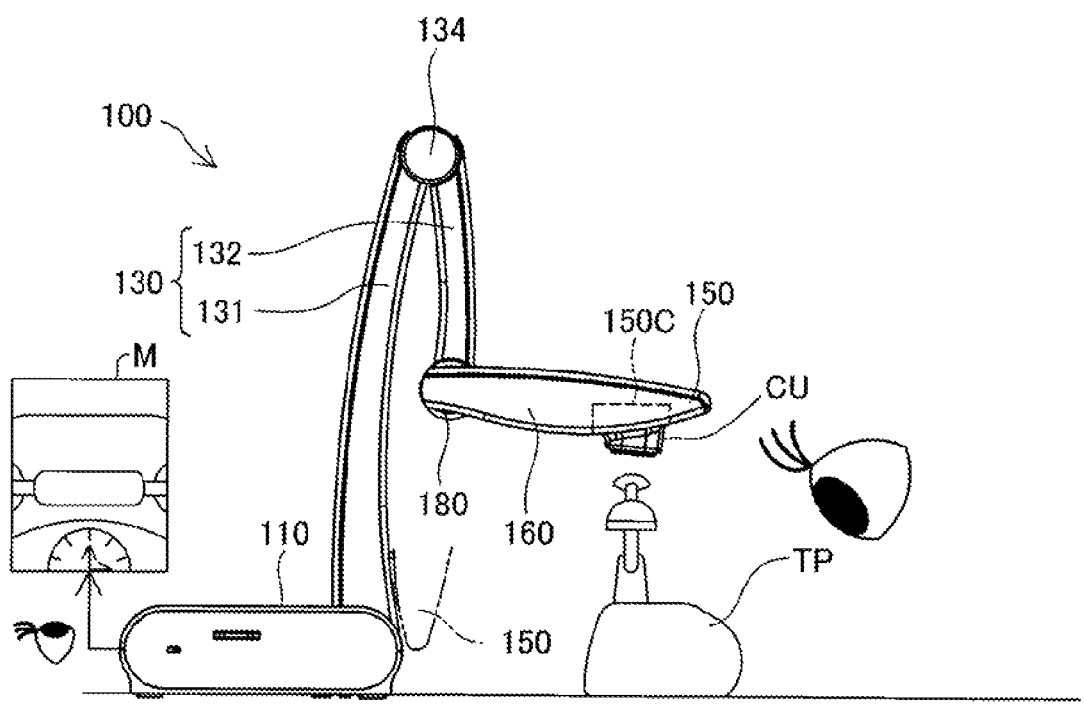
FIG. 17 is an explanatory view schematically showing the imaging device 100 set in a third imaging mode, where a camera position is lowered, to take an image of the three-dimensional subject TP and a resulting image output.
Figure 18:
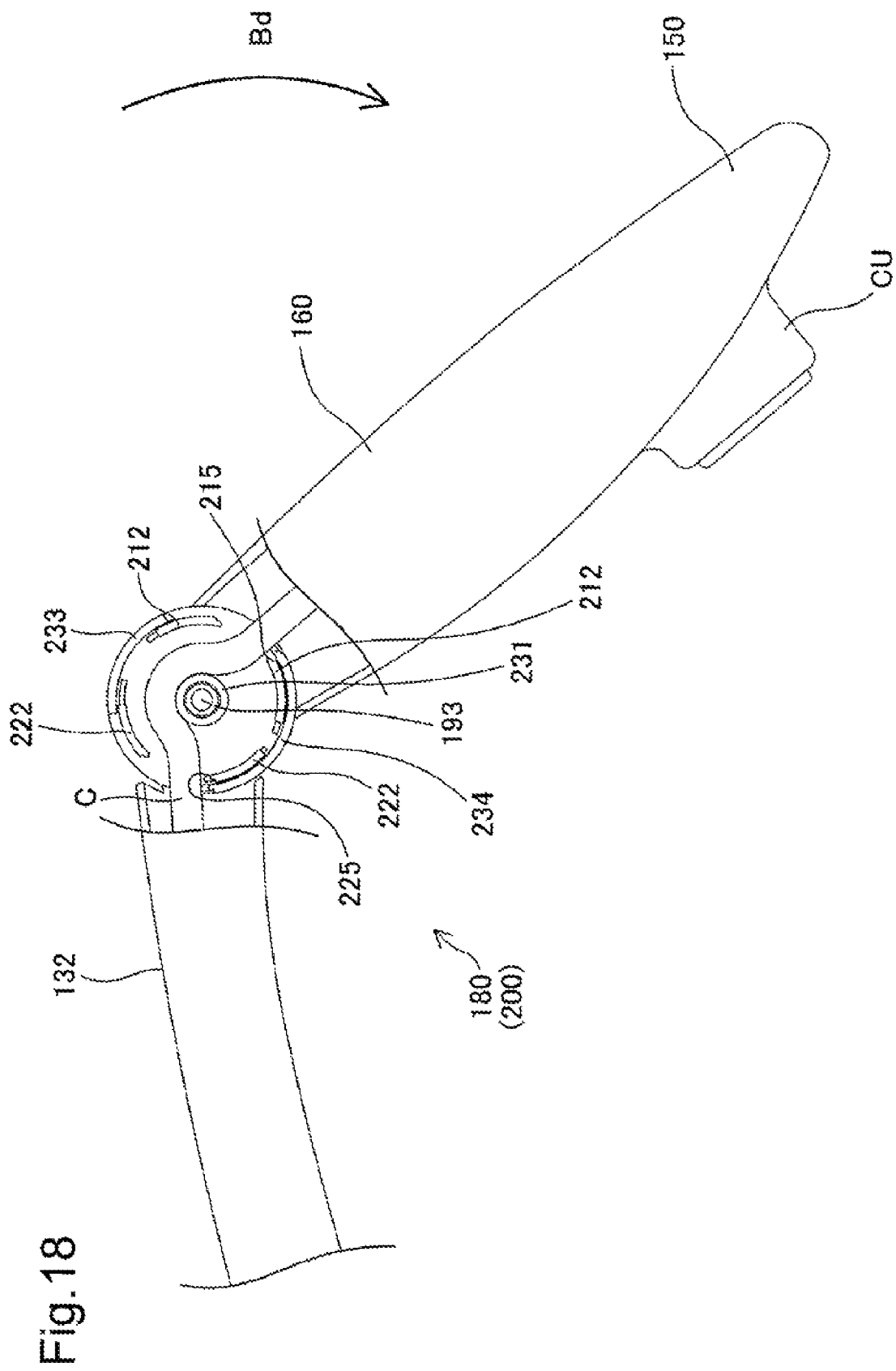
FIG. 18 is an explanatory view showing a cord covering state of the cord covering unit 200 in the imaging device 100 set in the second imaging mode.
Figure 19:
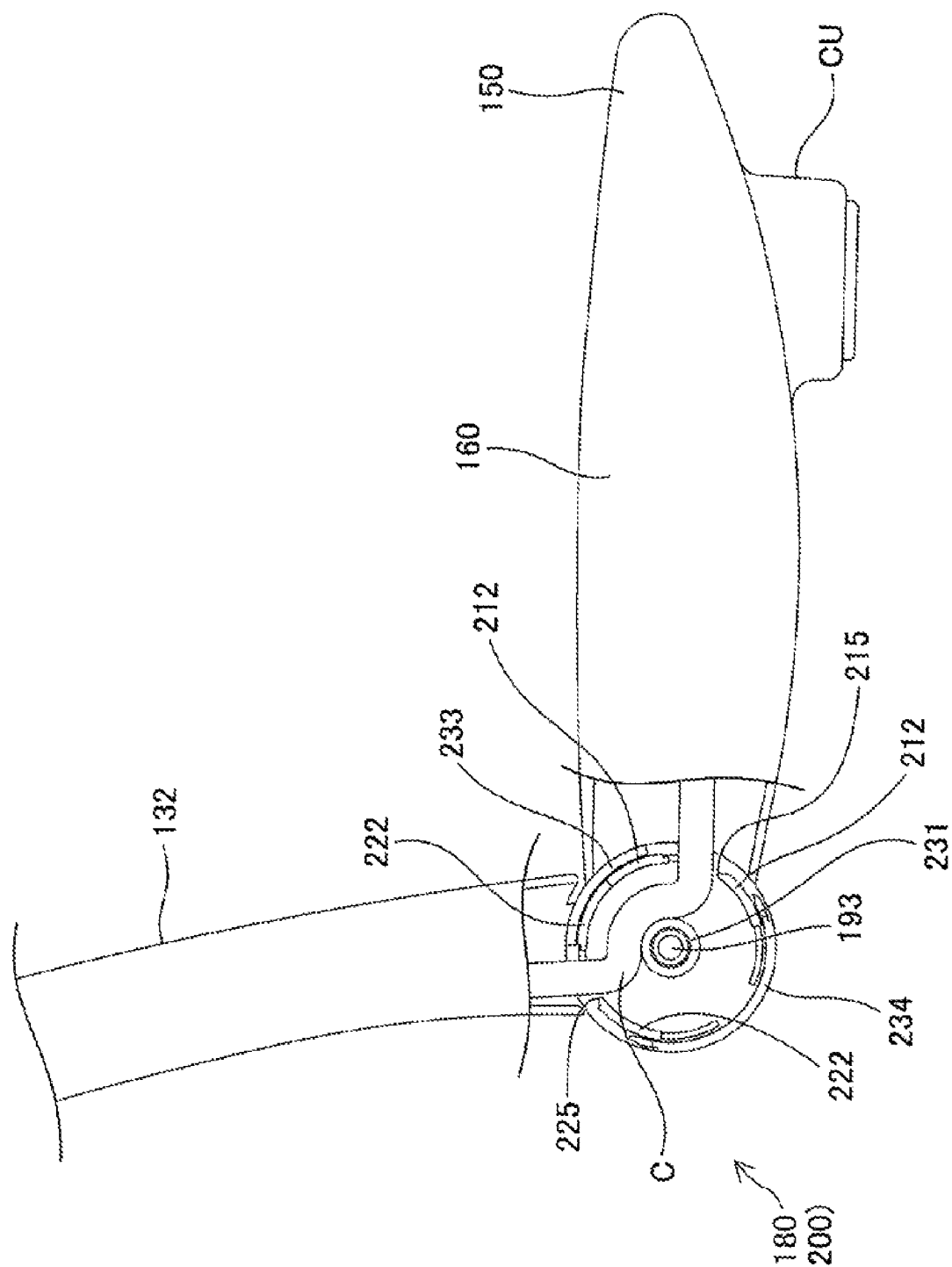
FIG. 19 is an explanatory view showing a cord covering state of the cord covering unit 200 in the imaging device 100 set in the third imaging mode.

The change of the cord covering state in the head arm pivot shaft support mechanism 180 is explained in relation to the change of the imaging mode of the imaging device 100. FIG. 15 is an explanatory view schematically showing the imaging device 100 set in the first imaging mode of FIG. 1 to take an image of a three-dimensional subject TP and a resulting image output. FIG. 16 is an explanatory view schematically showing the imaging device 100 set in the second imaging mode, where the camera head 150 is pivotally rotated oblique downward, to shoot oblique downward and take an image of the three-dimensional subject TP and a resulting image output. FIG. 17 is an explanatory view schematically showing the imaging device 100 set in the third imaging mode, where a camera position is lowered, to take an image of the three-dimensional subject TP and a resulting image output. FIG. 18 is an explanatory view showing a cord covering state of the cord covering unit 200 in the imaging device 100 set in the second imaging mode. FIG. 19 is an explanatory view showing a cord covering state of the cord covering unit 200 in the imaging device 100 set in the third imaging mode.

In the first imaging mode of the imaging device 100 shown in FIG. 15, as the head-side arm 160 of the camera head 150 is extended to be substantially aligned with the second arm 132, the internal camera of the camera head 150 is set at the furthermost position away from the imaging area and shoots downward to take a planner image of the three-dimensional subject TP. The planner image representing a plan view of the three-dimensional subject TP is accordingly output on a monitor M. In the second imaging mode of the imaging device 100 shown in FIG. 16, as the head-side arm 160 is rotated clockwise by about 45 degrees relative to the second arm 132, the internal camera of the camera head 150 shoots oblique downward to take an upward front image of the three-dimensional subject TP. With the change of the shooting direction to oblique downward, the upward front image representing an oblique front view of the three-dimensional subject TP is output on the monitor M. The camera position is lowered to have an enlarged image at a rate corresponding to the angle of rotation of the head-side arm 160. The angle of rotation of the head-side arm 160 is defined by the arc-shaped through slot 192 formed in the rotation restriction member 189 and may be varied by changing the arc trajectory of the arc-shaped through slot 192.

The cord covering state of the cord covering unit 200 in the head arm pivot shaft support mechanism 180 is changed with a change of the operation mode of the imaging device 100 to the second imaging mode. In the second imaging mode of FIG. 16, the camera head 150 is rotated clockwise about the pivot shaft member 193 relative to the second arm 132. As shown in FIG. 18, the rotation of the camera head 150 pulls the cord C placed on the sleeve 231 and set in the cuts 215 and 225. The clockwise rotation causes the cord C placed and bent on the sleeve 231 to be moved to have a further bend with a change of its trajectory corresponding to the rotation of the camera head 150. The cord C accordingly exerts a clockwise force on the first part 210 via its arc-shaped peripheral wall 212, while exerting a clockwise force on the second part 220 via its arc-shaped peripheral wall 222. The first part 210 and the second part 220 then rotate about the pivot shaft member 193, while keeping the cord C covered with the respective arc-shaped peripheral walls 212 and 222. In this state, the cord C is kept covered with the arc-shaped peripheral walls 212 and 222 on both the base side and the end side of the bifurcated head-side engagement legs 186 and 187.

The first arc-shaped peripheral wall 233 and the second arc-shaped peripheral wall 234 of the third part 230 fill the spaces between the arc-shaped peripheral walls 212 and 222 of the rotating first and second parts 210 and 220. When the cord C exerts a force onto the edges of the first arc-shaped peripheral wall 233 and the second arc-shaped peripheral wall 234 of the third part 230, the third part 230 also rotates about the pivot shaft member 193. In this state, the spaces between the arc-shaped peripheral walls 212 and 222 of the first and the second parts 210 and 220 are kept filled with the first arc-shaped peripheral wall 233 and the second arc-shaped peripheral wall 234 of the third part 230. The head arm pivot shaft support mechanism 180 allows for the rotation of the head arm 160 in both directions to change the operation mode of the imaging device 100 between the first imaging mode of FIG. 15 and the second imaging mode of FIG. 16, while keeping the cord C between the cut 215 and the cut 225 covered with the arc-shaped peripheral walls 212, 222, 233, and 234 of the first through the third parts 210, 220, and 230 in the cord covering unit 200. Namely the head arm pivot shaft support mechanism 180 effectively covers the cord C during pivotal rotation of the camera head 150 in both directions about the pivot shaft member 193.

In the third imaging mode of the imaging device 100 shown in FIG. 17, as the head-side arm 160 of the camera head 150 is rotated to be bent relative to the second arm 132 folded back on the first arm 131, the internal camera of the camera head 150 is set at the nearest position to the imaging area and shoots downward to take an enlarged planner image of the three-dimensional subject TP. The enlarged planner image representing a plan view of the three-dimensional subject TP is accordingly output on the monitor M. In this third imaging mode, the head-side arm 160 is rotated counterclockwise by about 100 degrees from the configuration substantially aligned with the second arm 132. This angle of rotation of the head-side arm 160 is also defined by the arc-shaped through slot 192 formed in the rotation restriction member 189 and may be varied by changing the arc trajectory of the arc-shaped through slot 192.

The cord covering state of the cord covering unit 200 in the head arm pivot shaft support mechanism 180 is changed with a change of the operation mode of the imaging device 100 to the third imaging mode. In the third imaging mode of FIG. 17, the camera head 150 is rotated counterclockwise about the pivot shaft member 193 relative to the second arm 132. As shown in FIG. 19, the rotation of the camera head 150 pulls the cord C placed on the sleeve 231 and set in the cuts 215 and 225. The counterclockwise rotation causes the cord C placed and bent on the sleeve 231 to be moved to have a reverse bend with a change of its trajectory corresponding to the rotation of the camera head 150. The cord C accordingly exerts a counterclockwise force on the first part 210 via its arc-shaped peripheral wall 212, while exerting a clockwise force on the second part 220 via its arc-shaped peripheral wall 222. The first part 210 and the second part 220 then rotate about the pivot shaft member 193, while keeping the cord C covered with the respective arc-shaped peripheral walls 212 and 222. In this state, the cord C is kept covered with the arc-shaped peripheral walls 212 and 222 on both the base side and the end side of the bifurcated head-side engagement legs 186 and 187.

The first arc-shaped peripheral wall 233 and the second arc-shaped peripheral wall 234 of the third part 230 fill the spaces between the arc-shaped peripheral walls 212 and 222 of the rotating first and second parts 210 and 220. When the cord C exerts a force onto the edges of the first arc-shaped peripheral wall 233 and the second arc-shaped peripheral wall 234 of the third part 230, the third part 230 also rotates about the pivot shaft member 193. In this state, the spaces between the arc-shaped peripheral walls 212 and 222 of the first and the second parts 210 and 220 are kept filled with the first arc-shaped peripheral wall 233 and the second arc-shaped peripheral wall 234 of the third part 230. The head arm pivot shaft support mechanism 180 allows for the rotation of the head arm 160 in both directions to change the operation mode of the imaging device 100 between the first imaging mode of FIG. 15 and the third imaging mode of FIG. 17, while keeping the cord C between the cut 215 and the cut 225 covered with the arc-shaped peripheral walls 212, 222, 233, and 234 of the first through the third parts 210, 220, and 230 in the cord covering unit 200. Namely the head arm pivot shaft support mechanism 180 effectively covers the cord C during pivotal rotation of the camera head 150 in both directions about the pivot shaft member 193.

As explained above, when the operation mode of the imaging device 100 is changed to the third imaging mode shown in FIG. 17, the first part 210 and the second part 220 are rotated in opposite directions based on the directions of the forces exerted by the cord C. The rotations of the first part 210 and the second part 220 in the opposite directions make the arc-shape peripheral wall 212 and the arc-shaped peripheral wall 222 close to each other on their respective one edges located on the upper side of FIG. 19. The angle of rotation of the head-side arm 160 to change the operation mode to the third imaging mode is defined by the arc trajectory of the arc-shaped through slot 192 as mentioned previously. The dimensions of the arc-shaped peripheral walls 212 and 222 of the first part 210 and the second part 220 are determined to prohibit the direct contact of the arc-shaped peripheral wall 212 with the arc-shaped peripheral wall 222 in the third imaging mode. The rotations of the first part 210 and the second part 220 in the opposite directions make the arc-shape peripheral wall 212 and the arc-shaped peripheral wall 222 away from each other on their respective other edges located on the lower side of FIG. 19. The dimension of the first arc-shaped peripheral wall 233 of the third part 230 is determined to fill the space between the distant edges of the arc-shaped peripheral walls 212 and 222.

The operation mode of the imaging device can be changed to the third imaging mode shown in FIG. 17 by rotating only the head-side arm 160 of the camera head 150 counterclockwise at the head arm pivot shaft support mechanism 180 from the folding configuration in the non-use condition of FIG. 2 where both the head-side arm 160 of the camera head 150 and the second arm 132 are folded back on the first arm 131. Namely the third imaging mode is readily set by simply rotating the head-side arm 160 relative to the second arm 132 to be lifted up from the configuration folded back on the first arm 131.

In the imaging device 100 of the embodiment, the first part 210 and the second part 220 of the cord covering unit 200 are designed to be rotatable about the pivot shaft member 193 in the head arm pivot shaft support mechanism 180. The convex pieces 214 formed on both the edges on the free end of the arc-shaped peripheral wall 212 of the first part 210 and the convex pieces 224 formed on both the edges on the free end of the arc-shaped peripheral wall 222 of the second part 220 are respectively set in the first arc-shaped through slots 236 and the second arc-shaped through slots 237 formed in the third part 230. The first arc-shaped through slots 236 and the second arc-shaped through slots 237 are arranged to form the arc pathways along the rotation trajectories of the respective arc-shaped peripheral walls 212 and 222. The first part 210 and the second part 220 are thus held by their through holes 211 and 221, as well as by the edges on the free ends of the respective arc-shaped peripheral walls 212 and 222 to be rotatable in a double supporting manner. This arrangement desirably assures the smooth and stable rotations of both the first part 210 and the second part 220. This contributes to the effect of covering the cord in the head arm rotation support shaft mechanism 180.

In the imaging device 100 of this embodiment, the base 110 does not have a stage for mounting a shooting object thereon and is thereby formed in relatively small dimensions. This arrangement desirably saves the space required for the imaging device 100 in the folding configuration in the non-use condition of FIG. 2.

The embodiment and its applications discussed above are to be considered in all aspects as illustrative and not restrictive. There may be many modifications, changes, and alterations without departing from the scope or spirit of the main characteristics of the present invention. In one modified structure where the first arm 131 is arranged to rise substantially upright from a base having a stage for mounting a shooting object thereon, the head-side arm 160 of the camera head 150 may be supported in a pivotally rotatable manner on the second arm 132 via the head arm pivot shaft support mechanism 180.

In another modified structure, the first arc-shaped through slots 236 and the second arc-shaped through slots 237 of the third part may be replaced by concaves of arc trajectories to receive therein the convex pieces 214 formed on the arc-shaped peripheral wall 212 of the first part 210 and the convex pieces 224 formed on the arc-shaped peripheral wall 222 of the second part 220. The inner circumferential faces of the first arc-shaped peripheral wall 232 and the second arc-shaped peripheral wall 234 of the third part 230 may be arranged to guide the outer circumferential faces of the arc-shaped peripheral walls 212 and 222 of the first and the second parts 210 and 220. The first arc-shaped peripheral wall 233 and the second arc-shaped peripheral wall 234 of the third part 230 may be formed along the inner circumferential faces of the arc-shaped peripheral walls 212 and 222 of the first and the second parts 210 and 220.

In the structure of the embodiment described above, the second arm 132 has the bifurcated arm support-side engagement legs 182 and 183 to support the head-side arm 160. Alternatively the second arm 132 may have a single arm support-side engagement leg. In this modified structure, the pivot shaft member 193 for supporting the bifurcated head-side engagement legs 186 and 187 to allow for the rotation of the head-side arm 160 is held in a single supporting manner on the side of the second arm 132. The single arm support-side engagement leg should be formed to have a sufficiently large wall thickness to support the head-side arm 160 in a pivotally rotatable manner.

The imaging device 100 equipped with the head arm pivot shaft support mechanism 180 to support the camera head with the internal camera in a pivotally rotatable manner is described as the embodiment according to the invention. The technique of the invention is, however, not restricted to the imaging device 100 but is applicable to any pivot shaft support mechanism used in any of various devices other than the imaging device, as well as a device including any instrument unit other than the camera head with an internal electric instrument incorporated therein.

What is claimed is:

1. An arm pivot shaft support mechanism configured to support an arm extended from an instrument unit with an internal electric instrument incorporated therein, the arm pivot shaft support mechanism comprising:

bifurcated arm-side engagement legs provided on a terminal end of the arm;

a rotation support-side engagement leg provided on an opposed end, which is opposed to the terminal end of the arm, of a rotation support arm, on which the arm is supported in a pivotally rotatable manner;

a pivot shaft inserted and fitted in through holes formed in the arm-side engagement legs and the rotation support-side engagement leg to support the arm via the arm-side engagement legs to be pivotally rotatable relative to the rotation support-side engagement leg;

a first engagement leg internal member and a second engagement leg internal member located on one of the bifurcated arm-side engagement legs and arranged to be respectively rotatable about the pivot shaft; and a third engagement leg internal member located on the other of the bifurcated arm-side engagement legs and arranged to be rotatable about the pivot shaft, wherein the first engagement leg internal member has: an arc-shaped base-side peripheral wall protruded toward the third engagement leg internal member to fill a space on a bifurcation base side between the bifurcated arm-side engagement legs; and a base-side cord pathway formed in the base-side peripheral wall to receive and allow for passage of a cord extended from the internal electric instrument, the second engagement leg internal member has: an arc-shaped end-side peripheral wall protruded toward the third engagement leg internal member to fill a space on a bifurcation end side between the bifurcated arm-side engagement legs; and an end-side cord pathway formed in the end-side peripheral wall to receive and allow for passage of the cord with avoiding interference with the pivot shaft, the third engagement leg internal member has: arc-shaped block peripheral walls protruded toward the first engagement leg internal member and the second engagement leg internal member to fill spaces between edges of the base-side peripheral wall and edges of the end-side peripheral wall.

2. The arm pivot shaft support mechanism in accordance with claim 1, wherein the arc-shaped block peripheral walls of the third engagement leg internal member are located outside the base-side peripheral wall and the end-side peripheral wall, and the third engagement leg internal member further has arc-shaped guide elements provided along rotation trajectories of the base-side peripheral wall of the first engagement leg internal member and the end-side peripheral wall of the second engagement leg internal member about the pivot shaft.

3. An imaging device configured to point an internal camera incorporated in a camera head toward a shooting object set in an imaging area and take an image of the shooting object, the imaging device comprising:

a base;

a base-side first arm structured to rise substantially upright from the base;

a base-side second arm extended from the base-side first arm to have an extending configuration extended over the imaging area;

a base-side arm pivot shaft support mechanism configured to support the base-side second arm on the base-side first arm in a pivotally rotatable manner and allow for rotation of the base-side second arm in a certain direction to change a geometrical configuration from the extending configuration extended over the imaging area to a folding configuration folded back on the base-side first arm and rotation of the base-side second arm in an opposite direction reverse to the certain direction;

a head-side arm extended from the camera head to be transversely to an optical axis of the camera; and the arm pivot shaft support mechanism in accordance with either one of claims 1 and 2 configured to support the head-side arm, which is extended to be substantially aligned with the base-side second arm, to be pivotally rotatable relative to the base-side second arm, wherein the arm pivot shaft support mechanism allows for rotation of the head-side arm relative to the base-side second arm in the extending configuration extended over the imaging area until the internal camera of the camera head points toward the base-side first arm, and the arm pivot shaft support mechanism allows for rotation of the head-side arm relative to the base-side second arm in the folding configuration folded back on the base-side first arm until the internal camera of the camera head points the imaging area to shoot downward.

4. The imaging device in accordance with claim 3, wherein the base is located at a position having no interference with the imaging area.

\* \* \* \* \*